United States Patent [19]

Wing

[11] Patent Number: 4,979,857
[45] Date of Patent: Dec. 25, 1990

[54] EXTENDED COUNTERBORE NUT

[76] Inventor: George S. Wing, 531 Esplanade, Apt. 515, Redondo Beach, Calif. 90277

[21] Appl. No.: 314,464

[22] Filed: Feb. 22, 1989

[51] Int. Cl.$^5$ .................... F16B 31/00; F16B 33/04
[52] U.S. Cl. ..................................... 411/5; 411/432; 411/533
[58] Field of Search ........................ 411/2-5, 411/9-11, 432, 533, 535, 536, 237, 41, 14, 303

[56] References Cited

U.S. PATENT DOCUMENTS

| 2,872,961 | 2/1959 | Mills et al. ........................... 411/303 |
| 3,135,154 | 6/1964 | Zenzic . |
| 3,411,397 | 11/1968 | Birmingham ....................... 411/41 |
| 3,482,864 | 12/1969 | Bynum . |
| 3,602,976 | 9/1971 | Grube ............................... 411/2 X |
| 3,728,933 | 4/1973 | Grube ................................... 411/5 |
| 3,890,876 | 6/1975 | Dahl ..................................... 411/11 |
| 4,362,449 | 12/1982 | Hlinsky . |
| 4,427,326 | 1/1984 | Hobson et al. . |
| 4,431,353 | 2/1984 | Capuano . |
| 4,518,295 | 5/1985 | Matuschek . |
| 4,729,703 | 3/1988 | Sato . |
| 4,887,948 | 12/1989 | Calmettes ............................... 411/5 |

Primary Examiner—Neill R. Wilson
Attorney, Agent, or Firm—Christie, Parker & Hale

[57] ABSTRACT

An extended counterbore nut has a nut body and an attached collar extending from counterbore in the nut body. The bore of the collar is about equal in diameter to the major diameter of the thread of the bolt used with the nut so that the collar aligns the bolt and nut for threading. At a predetrmined axial load, the collar releases from the nut body and enters the counterbore, shortening the nut.

25 Claims, 2 Drawing Sheets

EXTENDED COUNTERBORE NUT

BACKGROUND OF THE INVENTION

The present invention relates to fasteners in general and, more in particular, to counterbored internally threaded fasteners such as collars or nuts.

Threaded fasteners have been used a long time to fasten workpieces together to form joints. (Threaded fasteners go by different names; internally threaded fasteners can be "nuts" or "collars;" externally threaded fasteners can be "bolts" or "studs;" in this specification all will be subsumed under "nuts" and "externally threaded fasteners" or "bolts.") A nut and bolt fastens workpieces together to form a joint by compressive engagement between the nut on one side of the workpieces and the head of the bolt on the opposite side. A nut has an internal thread that engages an external thread of a bolt to effect this engagement. A washer between a nut and the workpiece can protect the workpiece from being damaged by the nut as the nut rotates during tightening on the bolt; it does this by reducing and making more uniform friction acting on the workpiece. A washer can also distribute the compressive load of a nut evenly on a workpiece and can reduce the unit loading or pressure that the nut applies to the workpiece. To effect their respective functions, the hardness of washers can be different from the hardness of the nuts they are used with, usually the washers are harder.

A nut often has a counterbore between its thread and one axial end of the nut. The counterbore provides a space to accommodate thread convolutions of a bolt so that only a smooth shank of the bolt is within the workpieces fastened even though the workpieces have different total thickness; in other words, the same bolt can be used with different thickness workpieces without having its thread within the workpieces. (The avoidance of threads within the workpieces has substantial structural advantages.)

Cross-threading has plagued threaded fasteners. The thread of one fastener is suppose to be in the helical space between the thread convolutions of its mating fastener. Cross-threading occurs when the thread of one fastener does not align with the thread of the mating fastener; when the two threads are not in proper relationship to each other. When this occurs, the thread of one fastener cuts through the thread of its mating fastener and the integrity of the resulting joint is lost, or at least substantially prejudiced.

Cross-threading occurs when the fasteners are not in axial alignment when engagement is attempted during installation. The likelihood of cross-threading increases where fastener installation is not sufficiently sensitive to the resistance that occurs at the outset of crossthreading. Power wrenches, for example, apply high starting torques that result in cross-threading unless the fasteners are properly aligned.

Sometimes assembly of nuts and bolts with workpieces may be facilitated by initially hanging several nuts on the bolts that they will be used with and tightening later. This can be difficult in some environments. For example, in environments where gravity cocks the nuts with respect to the bolts hanging can produce cross-threading.

SUMMARY OF THE INVENTION

The present invention provides an extended counterbore nut characterized by a stand-off collar attached to a nut body to effectively extend the counterbore of the nut. The nut body has an internally threaded bore. It also has an axial counterbore concentric with the thread. The collar has an axial bore concentric with axial bore of the nut body. The stand-off collar attaches to the nut body at the base of the nut body's counterbore, proximate the mouth to the counterbore. Upon application of a predetermined axial load between the nut body and the collar, produced when the nut is tightened on a bolt against a workpiece, the stand-off collar moves into the counterbore of the nut body, shortening the nut. Preferably, the collar has an integral washer for engaging the workpiece.

In one embodiment of the present invention, the extended counterbore nut has a nut body with an internally threaded bore and a concentric counterbore. A ring resides in the counterbore and has a bore diameter equal to or slightly greater than the outside diameter of the collar. The collar stands off from the nut body at the mouth of the body's counterbore and attaches to the ring. An axial bore of the collar is concentric with the axial bore of the nut body. The diameter of the axial bore of the collar preferably provides a slip fit over the thread of the externally threaded fastener, as such, it may be equal to the major thread diameter of the externally threaded fastener, used with the nut, but it may be slightly larger. The external surface of the stand-off collar has a diameter to fit into the bore of the ring, preferably loosely. Means attach the collar to the ring and release the collar at a predetermined axial load applied between the nut body and the collar so that the collar can move into the ring. The attachment means preferably is a frangible zone between the collar and the ring. It is also preferred to attach the ring to the nut body for storage and handling, which can be done by a press fit or an adhesive bond.

Other means are preferred to attach the collar to the nut body. These include interference engagement between the two, preferably produced through a staking ring forced radially into compressive engagement with a top portion of the collar.

In a third embodiment, the collar attaches directly to the nut body through a frangible zone, eliminating the ring.

The extended counterbore nut of this invention provides a nut that aligns the externally threaded fastener with the nut body so that cross-threading is minimized. It does this by extending the counterbore through the collar. But when set, the nut has no greater stand-off profile than a nut with just a counterbore that accepts mating external threads of a bolt for grip accommodation. Further, the nut allows placement over the external threads without starting the threading, leaving the nut for a time, and later setting the nut; in short, the nut can readily "hang."

These and other features, aspects and advantages of the present invention will become more apparent from the following description, appended claims and drawings.

DESCRIPTION OF THE PREFERRED EMBODIMENTS

Figure 1:
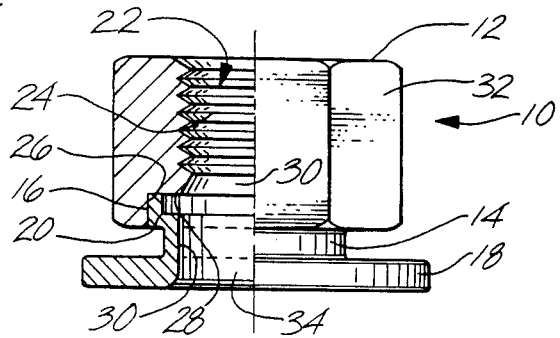
FIG. 1 is an elevational view, partly in half-section, of one embodiment of the extended counterbore nut of the present invention.
Figure 2:
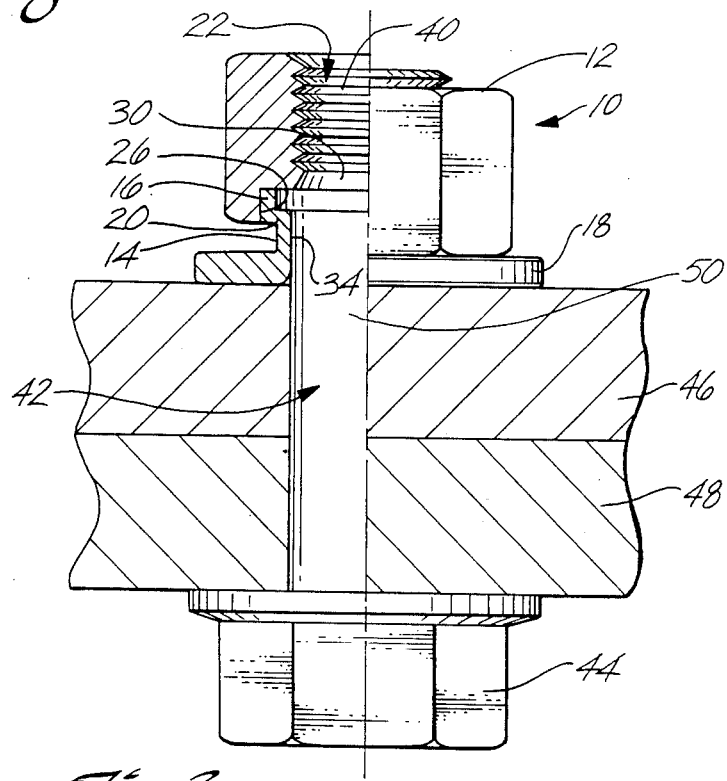
FIG. 2 views the extended counterbore nut of FIG. 1 as it is being installed to make a joint of the nut, a bolt, and a pair of workpieces. The FIGURE to the left of the center line is in half-section and shows the nut before the collar enters the counterbore of the nut body. The FIGURE to the right of the center line shows the nut at the completion of the joint.
Figure 3:
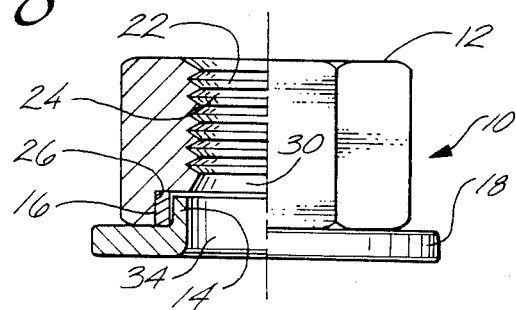
FIG. 3 shows the extended counterbore nut of FIGS. 1 and 2, again partly in half-section, with the collar in the counterbore as it appears in the completed joint.

FIGS. 1 through 3 show one embodiment of the extended counterbore nut 10 of the present invention. The nut comprises a nut body 12, a collar 14, a ring 16, and a washer 18.

Ring 16, collar 14, and washer 18 are one piece. Ring 16 is integral with collar 14 through a frangible zone 20 that fails on setting the nut.

Nut body 12 includes an axial bore 22. This bore is internally threaded at 24. An axial counterbore 26 extends from a base end of the nut body inwardly and meets bore 22 at a radial shoulder 28. Counterbore 26 is concentric with bore 22 and internal thread 24. The axial wall of counterbore 26 is right cylindrical. The diameter of the counterbore exceeds the root diameter of thread 24, the largest diameter in bore 22, by an amount sufficient to accept both ring 16 and collar 14 when the nut is set in a joint.

The ring and the collar junction at frangible zone 20 is at the mouth of counterbore 26 to maximize the distance of the collar from the internal thread before setting while minimizing the axial length of the nut after setting by having the collar and the ring completely within the counterbore.

The diameter of the counterbore is sufficiently large relative to the outside diameter of ring 16 that the ring can rotate with respect to nut body 12 upon the application of a small applied torque to the nut body so that washer 18 does not rotate on the work. It may be desirable, however, to have the ring press fitted into counterbore 26 so that the ring, collar and washer unit attaches to the nut body for storage and handling. If so, collar 14 should be able to freely rotate within ring 16 after failure of the frangible zone and that failure should occur at a low axial load. Alternatively, the ring can be bonded to the nut with an adhesive that fails at low torque.

The axial length of counterbore 26 substantially equals the axial length of collar 14. A pilot chamfer 30 between counterbore 26 and thread 22 guides the end of a bolt into the thread. The chamfer is conical with its base at shoulder 28. Nut body 12 has hexagonal wrenching flats 32. Preferably, washer 18 is harder than nut body 12, as is standard practice with washers and nuts.

Ring 16 has an axial length substantially equal to the axial length of counterbore 26 and of collar 14. The inside diameter of ring 16 is substantially equal to the outside diameter of the collar 14. Both the ring and the collar are right cylindrical. Frangible zone 20 is merely an annular neck connecting the ring and the collar that fails at a predetermined axial load applied between the nut body and the collar during the fabrication of a joint. This axial load is applied to the nut by the bolt and applied to the collar by the workpieces. When set, the ring and collar nest within the counterbore with the base of the nut body in engagement with the washer.

Collar 14 and washer 18 have an axial bore 34 concentric with counterbore 26 and axial bore 22 of the nut body. Bore 34 has a diameter equal to or slightly larger than the major thread diameter of the externally threaded fastener used with the extended counterbore nut to provide a slip to a slight clearance between the thread and the wall of the bore. Bore 34 is comparatively long. It is also displaced from thread 24 by the length of counterbore 26 and pilot chamfer 30. Accordingly, the extended length provided by bore 32 axially aligns the nut on the externally threaded fastener so that no cross threading occurs.

Preferably, the collar and integral washer are held by the workpiece so that they do not rotate with respect to the workpiece during the tightening of the extended counterbore nut on its cooperating bolt. This can be achieved by making frangible zone 20 between collar 14 and ring 16 and the outside diameter of the collar with respect to the inside diameter of ring 16 such that upon failure of the frangible zone, the ring can rotate around the collar.

Ring 16 is preferably attached to nut body 12 for handling and storage purposes. The attachment can be by a slight press fit or an adhesive bond. If the frangible zone is strong, the ring should be able to rotate with respect to the nut body upon the application of only a modest torque.

With reference to FIG. 2, the fabrication of a joint with extended counterbore nut 10 begins in a standard manner by threading the nut onto external threads 40 of a cooperating bolt 42. The bolt has a head 44 that cooperates with washer 18 to bear against abutting workpieces 46 and 48. With the tightening of extended counterbore nut 10 onto bolt 42, the axial load on frangible zone 20 increases until the zone fails. At this time, collar 14 moves inside ring 16 until the base of the nut contacts washer 18. During this installation, workpiece 46 holds washer 18 and collar 14 from rotating with counterbore nut 10. After installation, as can be seen in FIG. 3, ring 16 and collar 14 are completely inside counterbore 26.

As can be seen in FIG. 2, the thread of bolt 42 is completely outside of workpieces 46 and 48. A smooth shank 50 of the bolt occupies the space within the workpieces. The thickness of workpieces 46 and 48 can be changed within limits so that no thread is within the workpieces; the counterbore can accommodate this variation in workpiece thickness, known as "grip," with the variation known as "grip accommodation."

The extended counterbore provided by collar 14 and washer 18 aligns the bolt and nut threads so that cross threading cannot occur. It does this because it is axially displaced from nut thread 24 by the distance of counterbore 26 and pilot chamfer 30 and because its diameter is substantially equal to the major thread diameter of bolt 42. By having the collar move into the counterbore of the nut, the installed profile height of the nut compares with a standard nut that has a counterbore for accepting threads of a bolt. Further, the extended counterbore has a diameter sufficiently close to the diameter of the bolt thread that the nut can be hung on the bolt thread preparatory to installation. Accordingly, the bolt and nut can be positioned in any orientation from vertical to horizontal without falling off the bolt or getting out of axial alignment.

Figure 4:
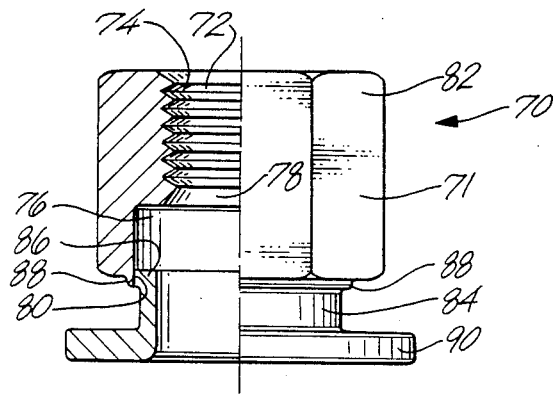
FIG. 4 is an elevational view, partly in half-section, of an alternate and preferred embodiment of the present invention, showing a staking ring at the base of the nut body just prior to its being forced radially inward into interference engagement with the top of the collar.
Figure 5:
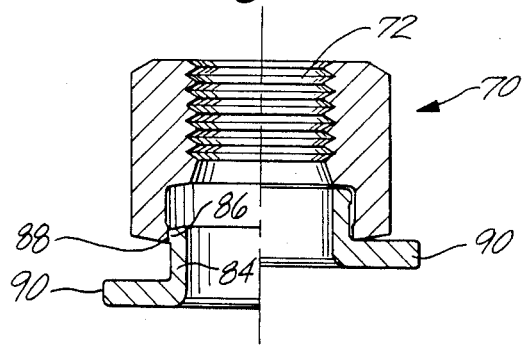
FIG. 5 is a view in half-section of the nut of FIG. 4 with the staking ring radial in compressive interference engagement with the collar on the left-hand side of the center line, and with its connection broken on the right-hand side of the center line, as it would appear in the completed joint.

FIGS. 4 and 5 show the presently preferred embodiment of the extended counterbore nut of the present invention. This embodiment is similar to the one previously described except that no ring is provided to couple the collar to the nut body; instead, an interference fit couples the two together. In these FIGURES, an extended counterbore nut 70 has a nut body 71 that has an axial bore 72 that is threaded at 74. A counterbore 76 opens into bore 72 at a conical pilot chamfer 78 of bore 72. The counterbore opens at the base end of nut body 71 at a mouth 80. The nut body has wrenching means in the form of wrenching flats 82.

A generally right cylindrical collar 84 has an externally extending flange 86 at its top that fits into counterbore 76 at mouth 80. A depending staking ring 88 of the nut body engages this external flange. A washer 90 is integral with collar 84.

In FIG. 4, staking ring 88 extends axially from the base of the nut. The staking ring has a right cylindrical bore and an exterior radial wall that has a taper that converges towards its free end. The taper of this wall produces a radial component of force when compressed against a flat surface, as occurs during the final stages of the fabrication of nut 70. This is how the staking ring looks just before final assembly. In final assembly, the staking ring is forced radially inward against flange 86 to effect interference with it, as shown in FIG. 5. Staking is accomplished by a pair of jaws that engage and confine the outside surface of collar 84 below flange 86 and also the upper surface of washer 90. A press then acts axially on nut body 71 applying a high axial force onto ring 88. The taper of ring 88 forces it to deform radially inward into compressive interference with flange 86, attaching the nut body to the collar and washer. Flange 86 is supported during the deformation of ring 88 by the upper surface of the jaws.

FIG. 5 to the right of the center line also shows the configuration of the collar, nut body and washer at the completion of a joint. The collar resides completely within the counterbore and the base of the nut engages the washer.

Figure 6:
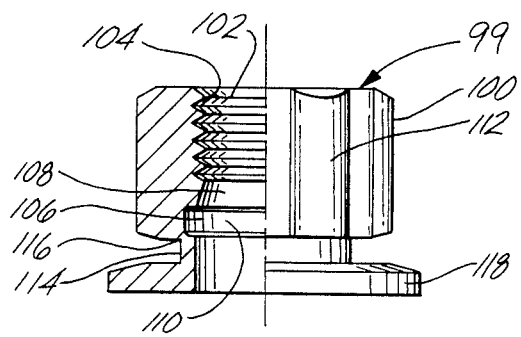
FIG. 6 is an elevational view, partly in half-section, of a third embodiment of the present invention where the collar and the nut body are integral and the collar attaches directly to the nut body at a frangible zone.

FIG. 6 shows a third embodiment of the present invention. This embodiment differs from the previously described embodiments by the collar being integral with the nut body through a frangible zone. In FIG. 6, an extended counterbore nut 99 has a nut body 100. The nut body has an axial bore 102 that has threads 104. A counterbore 106 opens into bore 102 at a conical pilot chamfer 108 of the bore. Counterbore 106 also has a mouth 110 at the base of the nut body. Nut body 100 has wrenching means in the form of axially extending lobes 112 on the outside surface of the nut body. A collar 114 connects to the nut body at a frangible zone 116. A washer 118 is integral with collar 114 at the bottom of the assembly.

The extended counterbore, shown in FIG. 6, shares with the nut of FIGS. 1 through 3 a frangible zone forming an attachment. But in FIG. 6, the frangible zone is between the collar and the nut body, instead of between a ring and the collar.

As before, in the FIG. 6 embodiment, when the extended counterbore nut is set, collar 114 resides in counterbore 106 with the base of nut body engaging washer 118.

The present invention has been described with reference to certain preferred embodiments. The spirit and scope of the appended claims, however, should not necessarily be limited to this description.

I claim:

1. An extended counterbore nut comprising:
   (a) a nut body having an axial bore with an internal thread for accepting an external thread of an externally threaded fastener, means for accepting a wrenching tool, and a counterbore concentric with the axial bore, the counterbore opening into the axial bore within the nut body and having a mouth at one end of the nut body, the counterbore having a diameter greater than the major axial bore;
   (b) a stand-off collar having an axial bore concentric with the axial bore of the nut body and a diameter substantially equal to the root diameter of the internal thread so that the thread of the externally threaded fastener used with the nut fits into the bore of the collar with at least a close fit, the stand-off collar having an external diameter to fit into the counterbore of the nut body; and
   (c) means for attaching the stand-off collar to the nut body so that the collar extends axially away from the nut body at the mouth of the counterbore, the attachment means releasing the collar at a predetermined axial load applied between the nut body and the collar so that the collar moves into the counterbore shortening nut.

2. The extended counterbore nut claimed in claim 1 wherein the attachment means include interference engagement between the collar and the nut body at the mouth.

3. The extended counterbore nut claimed in claim 2 including a washer attached to the collar on the side of the collar opposite the nut body for contacting the work to be fastened and the diameter of the axial bore of the collar is substantially equal to the root diameter of the internal thread so that the thread of the externally threaded fastener used with the nut fits in the bore of the collar with a close fit.

4. The extended counterbore nut claimed in claim 1 wherein the attachment means includes a frangible zone between the collar and the nut body at the mouth, the frangible zone failing upon the application of a predetermined axial load between the collar and the nut body, the collar telescoping into the counterbore after such failure.

5. The extended counterbore nut claimed in claim 4 including a washer attached to the collar on the side of the collar opposite the nut body for contacting the work to be fastened and the diameter of the axial bore of the collar is substantially equal to the root diameter of the internal thread so that the thread of the externally threaded fastener used with the nut fits in the bore of the collar with a close fit.

6. The extended counterbore nut claimed in claim 5 wherein the collar and washer can rotate with respect to the nut body in response to friction between the washer and the work occurring during the installation of the nut on the external fastener during the forming of a joint.

7. The extended counterbore nut claimed in claim 6 wherein the counterbore and the collar are right cylindrical and of substantially equal axial length.

8. The extended counterbore nut claimed in claim 1 including a washer attached to the collar on the side of the collar opposite the nut body for contacting the work to be fastened.

9. The extended counterbore nut claimed in claim 8 wherein the collar and washer can rotate with respect to the nut body in response to friction between the washer and the work occurring during the installation of the nut on the external fastener during the forming of a joint.

10. An extended counterbore nut claimed in claim 2 comprising:
- a nut body having an axial bore with an internal thread for accepting an external thread of an externally threaded fastener, means for accepting a wrenching tool, and a counterbore concentric with the axial bore, the counterbore opening into the axial bore within the nut body and having a mouth at one end of the nut body, the counterbore having a diameter greater than the major axial bore;
- a stand-off collar having an axial bore concentric with the axial bore of the nut body, the diameter of the axial bore of the collar being substantially equal to the root diameter of the internal thread so that the thread of the externally threaded fastener used with the nut fits in the bore of the collar with at least a close fit, the stand-off collar having an external diameter to fit into the counterbore of the nut body;
- means for attaching the stand-off collar to the nut body so that the collar extends axially away from the nut body at the mouth of the counterbore, the attachment means including an axial ring within the counterbore and having an internal diameter at least equal to the external diameter of the collar and means between the ring and the collar to attach the two together until the application of the predetermined axial load whereupon the collar telescopes into the ring for releasing the collar at a predetermined axial load applied between the nut body and the collar so that the collar moves into the counterbore shortening the nut; and
- a washer attached to the collar on the side of the collar opposite the nut body for contacting the work to be fastened.

11. The extended counterbore nut claimed in claim 10 wherein the collar and washer can rotate with respect to the nut body in response to friction between the washer and the work occurring during the installation of the nut on the external fastener during the forming of a joint.

12. The extended counterbore nut claimed in claim 10 wherein the washer and the ring are integral with the collar.

13. The extended counterbore nut claimed in claim 12 wherein the attachment means includes a frangible zone between the ring and the collar.

14. The extended counterbore nut claimed in claim 13 wherein the frangible zone is at the base of the ring and the top of the collar at an axial location substantially the same as the axial location of the mouth.

15. The extended counterbore nut claimed in claim 14 wherein the axial length of the ring and of the collar are substantially equal and the ring has an axial length substantially equal to the length of the counterbore.

16. The extended counterbore nut claimed in claim 15 wherein the collar and washer can rotate with respect to the nut body in response to friction between the washer and the work occurring during the installation of the nut on the external fastener during the forming of a joint.

17. The extended counterbore nut claimed in claim 12 wherein the collar and the ring are right cylindrical.

18. An extended counterbore nut claimed in claim 2 comprising:
- a nut body having an axial bore with an internal thread for accepting an external thread of an externally threaded fastener, means for accepting a wrenching tool, and a counterbore concentric with the axial bore, the counterbore opening into the axial bore within the nut body and having a mouth at one end of the nut body, the counterbore having a diameter greater than the major axial bore;
- a stand-off collar having an axial bore concentric with the axial bore of the nut body and a diameter at least equal to the major thread diameter of the externally threaded fastener, the stand-off collar having an external diameter to fit into the counterbore of the nut body;
- means for attaching the stand-off collar to the nut body so that the collar extends axially away from the nut body at the mouth of the counterbore, the attachment means including an axial ring within the counterbore and having an internal diameter a least equal to the external diameter of the collar and means between the ring and the collar to attach the two together until the application of the predetermined axial load whereupon the collar telescopes into the ring for releasing the collar at a predetermined axial load applied between the nut body and the collar so that the collar moves into the counterbore, shortening the nut.

19. The extended counterbore nut claimed in claim 18 wherein the attachment means includes a frangible zone between the ring and the collar.

20. The extended counterbore nut claimed in claim 19 wherein the frangible zone is at the base of the ring and the top of the collar at an axial location substantially the same as the axial location of the mouth.

21. The extended counterbore nut claimed in claim 20 wherein the axial length of the ring and of the collar are substantially equal and the ring has an axial length substantially equal to the length of the counterbore.

22. An extended counterbore nut comprising:
- a nut body having an axial bore with an internal thread for accepting an external thread of an externally threaded fastener, means for accepting a wrenching tool and a counterbore concentric with the axial bore, the counterbore opening into the axial bore within the nut body and having a mouth at one end of the nut body, the counterbore having a diameter greater than the major axial bore;
- a stand-off collar having an axial bore concentric with the axial bore of the nut body, the diameter of the axial bore of the collar being substantially equal to the root diameter of the internal thread so that the thread of the externally threaded fastener used with the nut fits in the bore of the collar with a close fit, the stand-off collar having an external diameter to fit into the counterbore of the nut body;
- means for attaching the stand-off collar to the nut body so that the collar extends axially away from the nut body at the mouth of the counterbore, the attachment means including interference engagement between the collar and the nut body at the mouth for releasing the collar at a predetermined axial load applied between the nut body and the collar so that the collar moves into the counterbore shortening the nut; and a washer attached to the collar on the side of the collar opposite the nut body for contacting the work to be fastened; and wherein the nut body has a staking ring at the mouth and the interference engagement includes the staking ring engaging the collar in radial compressive interference.

23. The extended counterbore nut claimed in claim 22 wherein the collar and washer can rotate with respect to the nut body in response to friction between the washer and the work occurring during the installation of the nut on the external fastener during the forming of a joint.

24. The extended counterbore nut claimed in claim 23 wherein the collar and the counterbore are right cylindrical and of substantially equal axial length.

25. The extended counterbore nut claimed in claim 24 wherein the collar has an external, radially extending flange that engages the staking ring with the compressive interference.

* * * * *

UNITED STATES PATENT AND TRADEMARK OFFICE
CERTIFICATE OF CORRECTION

PATENT NO. : 4,979,857
DATED : December 25, 1990
INVENTOR(S) : George S. Wing

It is certified that error appears in the above-identified patent and that said Letters Patent is hereby corrected as shown below:

On the Front Page:

Abstract, line 2, after "from" insert -- the --.

Column 1, line 14, change "fastens" to -- fasten --.
Column 1, line 41, change "suppose" to -- supposed --.

Column 5, line 4, after "thread" insert -- so --.

In the Claims

Column 7, line 14, delete "claimed in claim 2"

Column 8, line 9, delete "claimed in claim 2"
Column 8, line 29, change "a" to -- at --.

Signed and Sealed this

First Day of December, 1992

*Attest:*

DOUGLAS B. COMER

*Attesting Officer*  Acting Commissioner of Patents and Trademarks